US007245586B2

(12) United States Patent
Bitar et al.

(10) Patent No.: US 7,245,586 B2
(45) Date of Patent: Jul. 17, 2007

(54) BUFFER MANAGEMENT BASED ON BUFFER SHARING ACROSS PORTS AND PER-PORT MINIMUM BUFFER GUARANTEE

(75) Inventors: Nabil Bitar, Winchester, MA (US); Philip To, Nashua, NH (US)

(73) Assignee: Lucent Technologies Inc., Murray Hill, NJ (US)

( * ) Notice: Subject to any disclaimer, the term of this patent is extended or adjusted under 35 U.S.C. 154(b) by 1054 days.

(21) Appl. No.: 10/233,835

(22) Filed: Aug. 30, 2002

(65) Prior Publication Data

US 2004/0042477 A1 Mar. 4, 2004

(51) Int. Cl.
  H04J 1/16 (2006.01)
  H04L 12/56 (2006.01)
(52) U.S. Cl. ...................... 370/235; 370/412
(58) Field of Classification Search ............ None
  See application file for complete search history.

(56) References Cited

U.S. PATENT DOCUMENTS

| | | | | |
|---|---|---|---|---|
| 5,867,663 A | * | 2/1999 | McClure et al. ............ 709/234 |
| 5,936,958 A | * | 8/1999 | Soumiya et al. ........ 370/395.43 |
| 5,995,486 A | * | 11/1999 | Iliadis ...................... 370/229 |
| 6,282,589 B1 | * | 8/2001 | Porterfield et al. ........... 710/52 |
| 6,377,546 B1 | * | 4/2002 | Guerin et al. ............... 370/230 |
| 6,625,159 B1 | * | 9/2003 | Singh et al. ................ 370/413 |
| 6,658,014 B1 | * | 12/2003 | Tezuka ...................... 370/412 |
| 6,680,906 B1 | * | 1/2004 | Nguyen ..................... 370/229 |
| 6,961,307 B1 | * | 11/2005 | Aweya et al. ............... 370/230 |
| 6,980,516 B1 | * | 12/2005 | Wibowo et al. ............ 370/235 |
| 7,047,312 B1 | * | 5/2006 | Aweya et al. ............... 709/235 |
| 2004/0213222 A1 | * | 10/2004 | Assa et al. .................. 370/389 |

\* cited by examiner

*Primary Examiner*—Andrew C. Lee
(74) *Attorney, Agent, or Firm*—Matthew J. Hodulik

(57) ABSTRACT

This invention introduces an intelligent buffering sharing scheme that supports multiple service classes and multiple drop priorities per class. The available buffers are shared between different queues but at the same time every queue will be guaranteed a certain minimum buffer allocation. Other schemes presented in the literature to not address this minimum buffer guarantee in the presence of multiple service classes and drop priorities. In addition, the scheme presented in this innovation is based on a static threshold approach that has certain implementation cost tradeoff with another dynamic threshold approach presented in the literature that deals with buffer management in the presence of multiple service classes and drop priorities per class.

9 Claims, 4 Drawing Sheets

AN N x N SWITCH FABRIC (PRIOR ART)

INGRESS VIRTUAL OUTPUT QUEUES AND EGRESS OUTPUT QUEUES

BUFFER MANAGEMENT BASED ON BUFFER SHARING ACROSS PORTS AND PER-PORT MINIMUM BUFFER GUARANTEE

FIELD OF THE INVENTION

The present invention relates generally to communications networks, and more particularly to buffer management techniques for switching devices used in such communications networks.

BACKGROUND OF THE INVENTION

With regard to data networking, a class of switching systems most commonly implemented today relies on particular schemes of input queueing as well as output queueing to achieve a high throughput non-blocking switching architecture. Input queueing, otherwise known as ingress scheduling, refers to scheduling into the switching fabric of a switching system. On the other hand, output queueing refers to scheduling onto the network on the system egress ports. In both cases, a finite memory space is used to hold packets before they get the chance to be transmitted out into the fabric or out to the network. Memory is often managed (allocated and freed) in fixed segments of bytes called buffers. A buffer is used to store data-packet segments and some sort of header that describes different characteristics of the data (e.g., destination, drop probability, position in the packet etc.)

An N×N switching fabric 10 can be logically represented as a black box with N input ports 12 and N output ports 14 as depicted in FIG. 1. The input and output ports are of equal speeds. The switch fabric arbitrates which input port gets to transmit to which output port at a given point in time. This arbitration is also referred to as fabric scheduling. There are multiple problems that may arise in such a system that mandate a good queueing architecture and a good buffer management scheme to reduce data loss and achieve fairness across ports. On the ingress side, for instance, it is possible that data packets simultaneously arrive on multiple input ports and they are destined to the same output port. Since input and output ports have equal speeds, this situation gives rise to output port congestion and packets will have to be buffered at the ingress of the fabric before they have the chance to be switched to the output port. In addition, packets destined to other egress ports may arrive on the same input port. It is important in this case that the packets destined to the congested output port do not block the packets destined to output ports that are not congested.

To avoid this kind of head-of-line (HOL) blocking, a set of N virtual output queues (VOQ's) 20 is usually implemented in each ingress port for each traffic class (FIG. 2). Thus, at a given input port 22, buffer space must be intelligently allocated for packets in different VOQ's. In a similar manner, on the egress side, a switch fabric port may branch out to several network ports of lower speed. In this case, an egress fabric port 24 acts as input to the M egress network ports 26 as shown in FIG. 2. Because of the speed difference between the switch fabric port and the network ports, packets may need to be buffered up momentarily and a fair and efficient algorithm is required to allocate buffer space to different network ports. For ease of discussion, in the rest of the document, both the ingress VOQ's and the egress port queues will be denoted simply as queues. The meaning of queues will depend on whether the buffer management scheme is used in the ingress or in the egress.

In a communication queueing system, it is often the case that not all data packets receive the same treatment. This is true in networking technologies that support Quality of Service (QoS) such as Asynchronous Transport Mode (ATM) and Differentiated Services (DS) in the Internet Protocol (IP). Thus, it is important to guarantee more assurance of packet delivery to more important packets. Service classes, and therefore packets that belong to them, can be ordered in terms of importance. Within a service class, some packets can be assigned a higher drop probability or loss probability than others making them less important to be delivered. Thus, it is important to manage the buffer space so that more important packets get more access to buffer space than less important packets.

Complete buffer sharing between different queues allows the available buffers to be used more efficiently and potentially leads to higher throughput and lower data loss probability. If buffers are statically allocated to queues, idle queues (i.e. queues that do not receive any data packets) will not use their allocated buffer space while filled or congested queues will see a high drop probability. If buffer sharing is allowed, a queue will be allowed to use more of the available buffer space thus reducing the drop probability. However, sharing can lead to one set of queues (even one queue) starving other queues of buffer space. Accordingly, there is a need for an improved buffer management technique that improves upon those deficiencies existing in the prior art.

SUMMARY OF THE INVENTION

This invention introduces an intelligent buffering sharing scheme that supports multiple service classes and multiple drop priorities per class. The available buffers are shared between different queues but at the same time every queue will be guaranteed a certain minimum buffer allocation. Other schemes presented in the literature do not address this minimum buffer guarantee in the presence of multiple service classes and drop priorities. In addition, the scheme presented in this innovation is based on a static threshold approach that has certain implementation cost tradeoff with another dynamic threshold approach presented in the literature that deals with buffer management in the presence of multiple service classes and drop priorities per class.

One embodiment of the invention discloses a method of operating a buffer in a communications device, where the buffer includes a guaranteed buffer portion for ports of the device supporting a designated service class and a shared buffer portion for use by any of the ports. A first variable S is a queue size for a service class and a second variable Sshared is the occupied amount of said shared buffer portion. The method includes the steps of enqueuing arriving buffer data and incrementing S correspondingly if S is less than the guaranteed buffer portion; enqueuing the buffer data and incrementing S and Sshared correspondingly if Sshared is less than the shared buffer portion and S is less than a maximum amount of buffers that may be occupied by a single queue; and discarding the buffer otherwise.

Another embodiment of the invention discloses a method of operating a buffer in a communications device, where the buffer includes a guaranteed buffer portion for each port of a designated service class and drop priority and a shared buffer portion having an aggregate threshold for each class and drop priority. For each queue in the buffer a first variable S is a queue length in the guaranteed buffer pool and a second variable Sshared is a queue length of the shared buffer portion. The method includes the steps of enqueuing arriving buffer data and incrementing S correspondingly if S is less than said guaranteed buffer portion; enqueuing the buffer data and incrementing Sshared correspondingly if Sshared is less than the shared buffer portion and Sshared is less than a maximum amount of buffers of a given drop priority that may be shared for a service class; and otherwise determining whether to discard the buffer data.

BRIEF DESCRIPTION OF THE DRAWINGS

A more complete understanding of the present invention may be obtained from consideration of the following detailed description of the invention in conjunction with the drawing, with like elements referenced with like references, in which.

DETAILED DESCRIPTION

Figure 1:
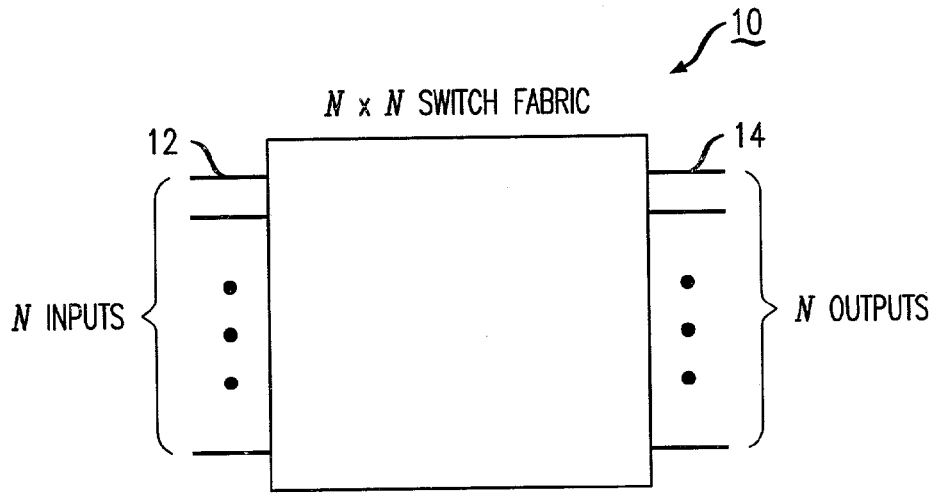
FIG. 1 is an exemplary embodiment of an N×N switch fabric.
Figure 2:
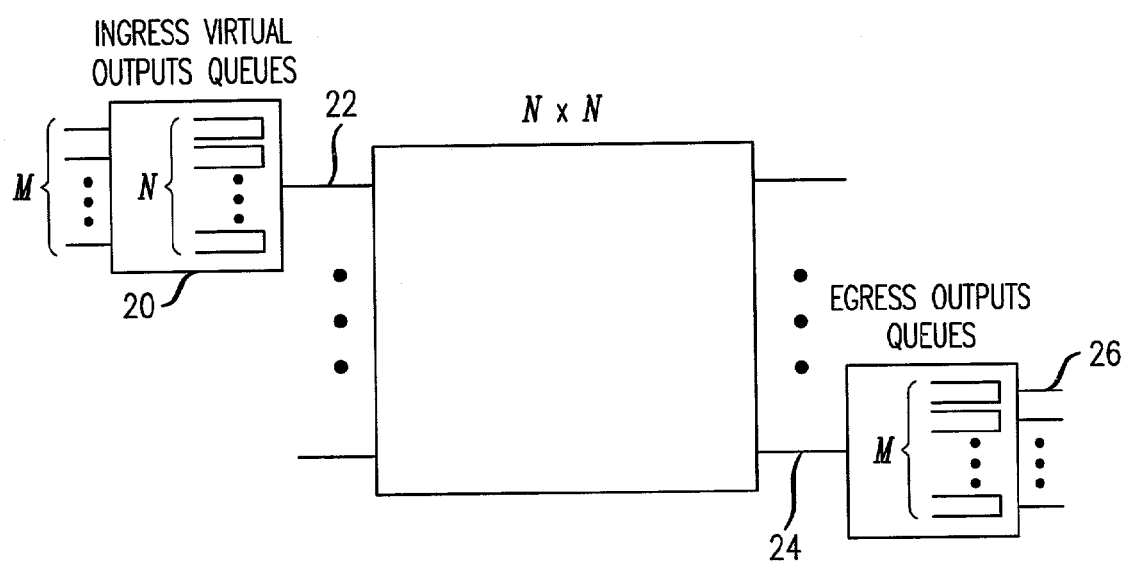
FIG. 2 illustrates ingress virtual output queues and egress output queues couple to a switch fabric.

The present invention allows efficient and fair buffer sharing between VOQ's. The disclosed techniques can also be used to allocate buffers to different network port queues fairly and efficiently. For ease of discussion, in the remainder of the document, both the ingress VOQ's and the egress port queues will be denoted simply as queues. The meaning of queues will depend on whether the buffer management scheme is used in the ingress or in the egress.

As discussed in the background, complete buffer sharing between different queues allows the available buffers to be used more efficiently and potentially leads to higher throughput and lower data loss probability. If buffers are statically allocated to queues, idle queues (i.e. queues that do not receive any data packets) will not use their allocated buffer space while filled or congested queues will see a high drop probability. If buffer sharing is allowed, a queue will be allowed to use more of the available buffer space thus reducing the drop probability. However, sharing can lead to one set of queues (even one queue) starving other queues of buffer space. Thus, it is important to have the capability to prevent starvation by guaranteeing each queue some minimum buffer space. In a QoS architecture, a buffer management scheme that has this capability must also respect the relative importance of service classes and the relative importance of packets within a service class. This protection capability may become very important when a service provider (SP) wants to sell different physical ports to different customers. In this case, it may be desirable to prevent the traffic of one customer from being affected by congestions in another customer's port. A good buffer management scheme should, therefore, be simple to implement, have predictable behavior, provide both buffer sharing and protection, and allow the available buffers to be used more efficiently and fairly, reducing data loss probability and increasing throughput.

The invention introduces an intelligent buffering sharing scheme that supports multiple service classes and multiple drop priorities per class. The available buffers are shared between different queues but at the same time every queue will be guaranteed a certain minimum buffer allocation. Other schemes presented in the literature do not address this minimum buffer guarantee in the presence of multiple service classes and drop priorities. In addition, the technique of the present invention is based on a static threshold approach that has certain implementation cost tradeoff with another dynamic threshold approach presented in the literature that deals with buffer management in the presence of multiple service classes and drop priorities per class.

A goal of the present invention is to satisfy as many of the following objectives as possible:
1. Buffer isolation among service classes
2. Sharable buffer space among queues with the same service class.
3. Guaranteed minimum buffer size per queue:
   a. guaranteed minimum buffer space per port
   b. guaranteed minimum buffer space per service class
4. A minimum guarantee of buffer space per queue for a drop priority relative to the next higher-drop priority.

More specifically, regarding the above objectives, the first criterion assumes that each service class is allocated a fixed buffer space from the buffer pool. The second criterion allows a port to capture more buffer space when fewer ports are active while still maintaining service class isolation. The third criterion guarantees each port a minimum buffer space per service class. This minimum is guaranteed for a port independent of the activity of the other ports. The fourth criterion assures that lower drop-priory traffic has guaranteed buffer space over the higher drop priority traffic so that higher drop priority traffic is not allowed to starve it out of buffer space. Although this approach assumes buffer isolation among service classes, this assumption can be possibly relaxed while maintaining the other criteria if desired. In the following, it is assumed that a packet is broken down into fixed size data segments for buffering.

No-Drop Priorities with Minimum Buffer Guarantee for Each Queue

Figure 3:
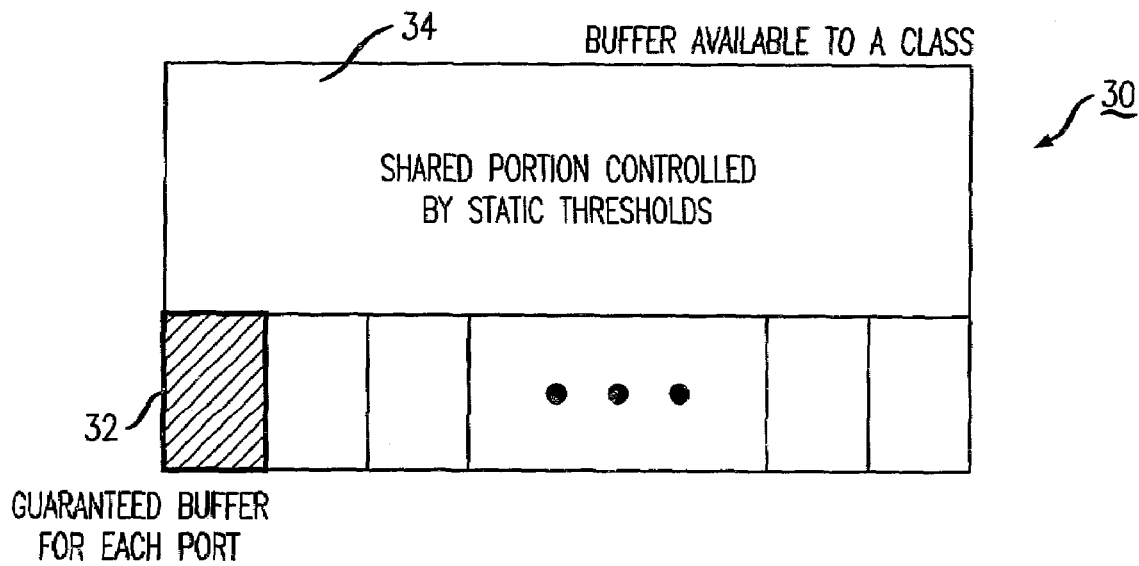
FIG. 3 shows one exemplary embodiment of a buffer arrangement in accordance with the invention.

In order to more easily explain the invention, a first embodiment thereof is disclosed wherein only a single drop priority is included for each service as well as a minimum buffer guarantee being implemented for each queue. Since buffer isolation among classes is assumed, the analysis can be done for one service class independent of others. For illustrative purposes, as discussed, it is assumed that there is no drop-priority distinction per service class. The idea is to guarantee a port a minimum amount of buffer space while allowing it to capture more buffers out of a sharable buffer pool. This is illustrated in FIG. 3 which shows an exemplary buffer 30 available to a service class. As shown, a portion 32 of the buffer is guaranteed for each port of the device which may receive or transmit traffic of the specific class and another portion 34 of the buffer is available to be shared by the various ports.

In order to achieve buffer sharing across ports per service class while still guaranteeing minimum available buffer space for any port at any time, two thresholds are defined for each service class. One threshold can be set to be the guaranteed buffer size per-port allocated for each of class i. Let this threshold be $GBpp_i$. The second threshold can be set to the aggregate threshold for the class, excluding the guaranteed buffers. Let this threshold be $Ta_i$. In a system of M queues and total buffer B allocated for class i, $GBpp_i$ and $Ta_i$ are subject to the following constraint:

$$B = MGBpp_i + Ta_i$$

Figure 4:
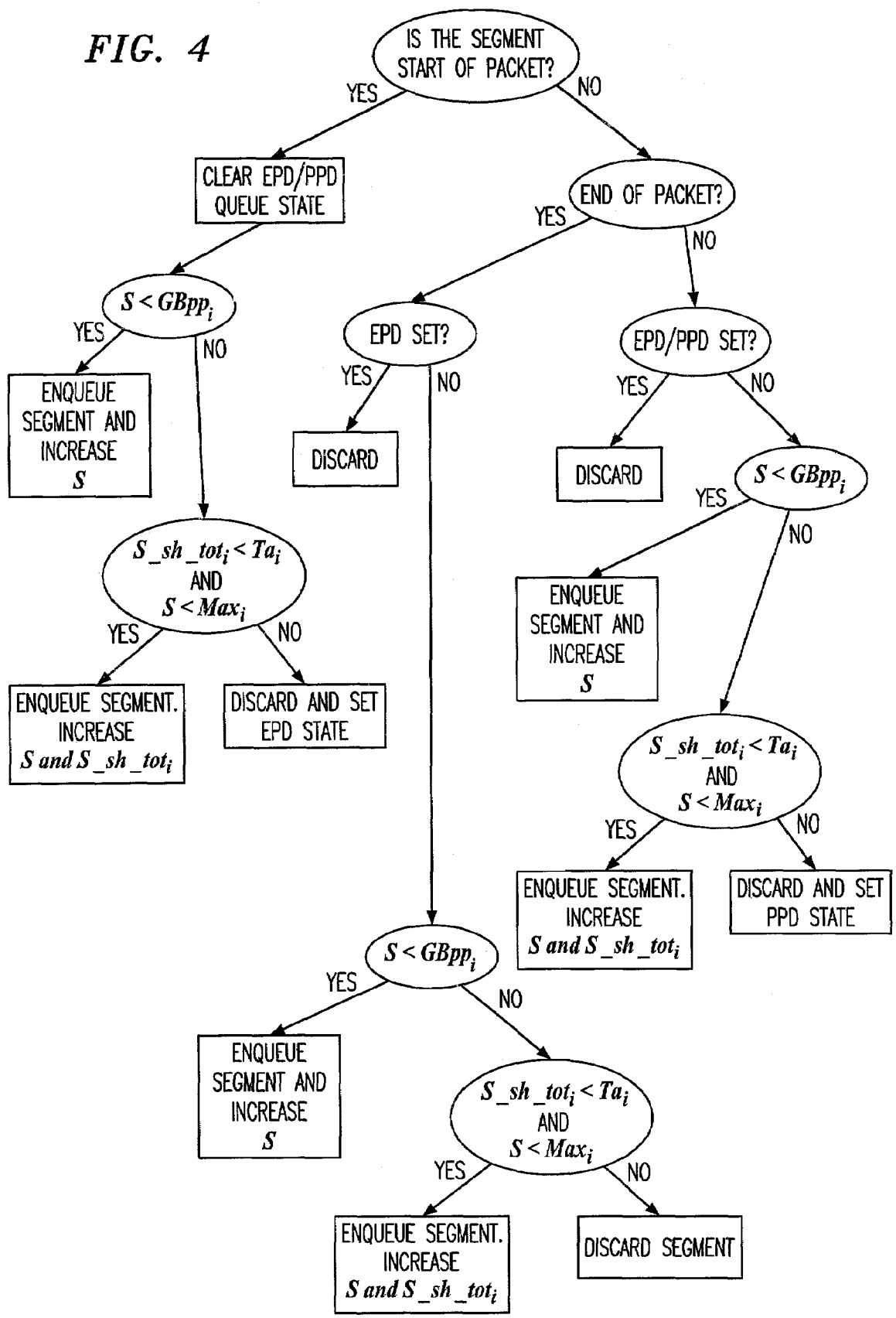
FIG. 4 is a flow diagram for implementing one embodiment of the invention.

For each class i, let $S\_sh\_tot_i$ be the total buffer occupied out of the sharable buffer pool. Whenever a queue exceeds its minimum reserved threshold, it has to borrow from that sharable pool. Referring to FIG. 4, the following discard/enqueueing policy can be applied when a data segment (of a given size of data) arrives to a queue of class i with queue length S:

1. If S is less than $GBpp_i$, enqueue the buffer and increment S (where S represents a count of the queue length). Otherwise, go to 2.
2. If ($S\_sh\_tot_i < Ta_i$ and $S < Max_i$), enqueue the buffer, increment S and $S\_sh\_tot_i$. Otherwise, go to 3.
3. Discard the buffer and set the PPD state until the end of the packet.

This policy guarantees that a single port cannot capture more than $Max_i$ buffers out of $B_i$ allocated for class i while guaranteeing a port a minimum of $GBpp_i$ buffers for class i all the time. ($Max_i$ controls the maximum amount of buffers usable by a queue even if there are still buffers available to borrow in the shared region. This prevents a single queue from eating up all the buffers in the sharable pool.) The disadvantage is that a count must be kept for the number of buffers taken from the shared pool. That is, whenever a buffer is dequeued from a queue, $S\_sh\_tot_i$ must be decremented if S exceeds $GBpp_i$. Additionally, the queue size must be decremented. This gets more complicated when more than one drop-priority exists per service class.

Multi Drop-Priorities, Buffer Sharing and Minimum Buffer Guarantee Per Port

Figure 5:
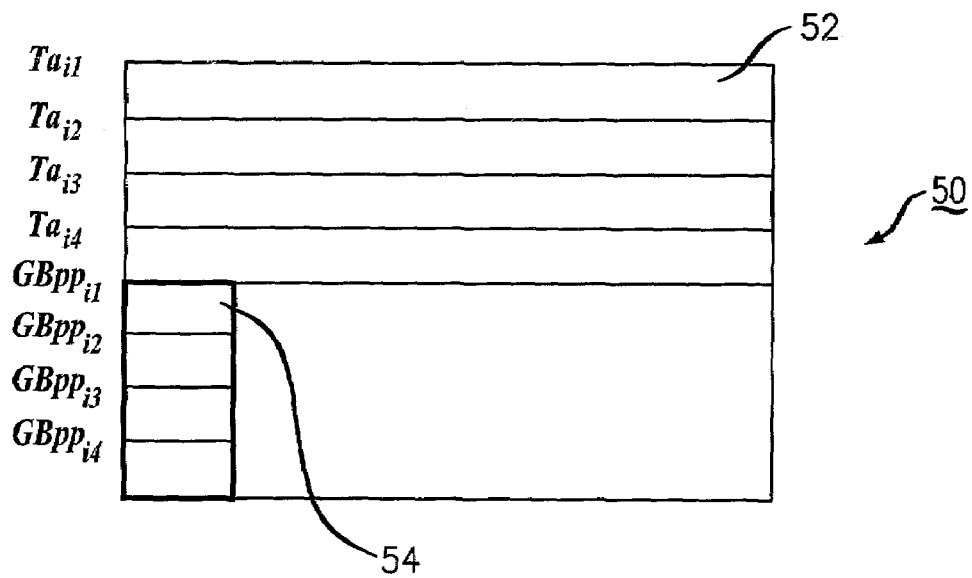
FIG. 5 is another exemplary embodiment of a buffer arrangement in accordance with the invention.

Another embodiment of the invention will now be described in which multi-drop priorities are included per class and buffer sharing and minimum buffer guarantees per port are implemented. The analysis here is also done for one service class with N drop-priority levels independent of other coexistent service classes, since buffer isolation is assumed among the service classes. Referring to FIG. 5, let $B_i$ 50 be the total buffer space allocated for class i. Let $Ta_{ij}$ 52 be the aggregate threshold for class i and drop-priority j. Let $GBpp_{ij}$ 54 be the buffer space reserved at each port for class i and drop priority j.

Lower-drop priority traffic can use the guaranteed or shared space allocated for higher drop-priority traffic but not vice versa. In other words, the guaranteed buffer space for each port is $GBpp_{i1}$, assuming that 1 is the lowest drop-priority and 4 is the highest drop-priority. In addition, if B is the buffer space allocated for class i in a system of M queues, the following constraint must be met:

$$B = M*GBpp_{i1} + Ta_{i1}$$

Figure 6:
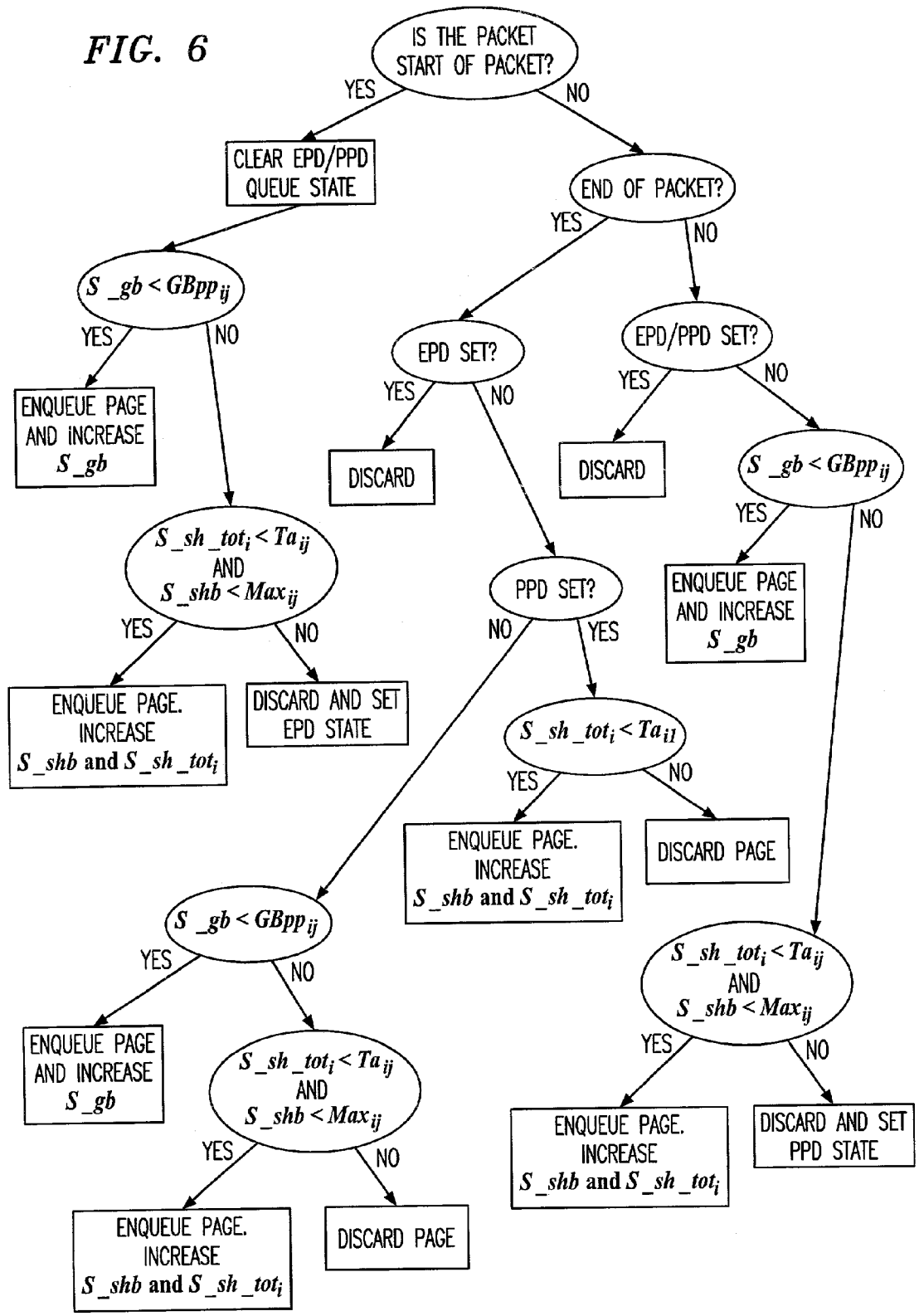
FIG. 6 shows a process diagram for implementing one embodiment of the invention.

For each queue, two counts are kept: (1) the number of buffers in the guaranteed buffer pool "S_gb", and (2) the number of buffers in the shared buffer pool "S_shb". When a data segment of class i and drop priority j arrives to a queue of class i with counts S_shb and S_gb, the following policy is applied (See FIG. 6):

1. If the arriving buffer is the start of a packet, clear the Early Packet Discard/Partial Packet Discard (EPD/PPD) state.
2. If S_gb is less than $GBpp_{ij}$, enqueue the buffer. Otherwise, go to 3.
3. If $S\_sh\_tot_i$ is less than $Ta_{ij}$ and S_shb is less than $Max_{ij}$, enqueue the buffer and increment S_shb and $S\_sh\_tot_i$. Otherwise, go to 4. In this case, $Max_{ij}$ is the maximum number of buffers with drop priority j that can exist in the shared buffer pool of class i for this queue.
4. For Deciding whether to discard a buffer, the following policy is used:
   If the buffer is the start of the packet, discard the buffer and set the EPD state.
   If the buffer is not the end of the packet, discard the buffer and set the PPD state.
   If the buffer is the end of the packet and EPD is not set, enqueue the buffer in the if S_gb is less than $GBpp_{ij}$. If not, then enqueue it if $S\_sh\_tot_i$ is less than $Ta_{i1}$. Otherwise, discard the buffer.

In addition, upon dequeueing a buffer from class i and drop priority j, the following actions must be taken:
1. If the data segment dequeued is taken from the guaranteed buffer pool, decrement S_gb.
2. If the data segment dequeued is taken from the shared buffer pool, decrement S_shb and $S\_sh\_tot_i$.

Assume that drop-priority 1 is the lowest and 4 is the highest. If the thresholds for a service class i are chosen such that:

$GBpp_{i1} > GBpp_{i2} > GBpp_{i3} > GBpp_{i4}$ and $Ta_{i1} > Ta_{i2} > Ta_{i3} > Ta_{i4}$ one can guarantee that for any port, there is always minimum buffer available for buffers with class i and drop priority j, relative to buffers with class i and drop priority (j+1). Using the scheme described in this section, it is guaranteed that only drop-priority 1 buffers can occupy the full buffer allocated for class i. It is also guaranteed that no single port can have more than $(Max_{ij} + GBpp_{ij})$ buffers of class i and drop-priority j enqueued. It is possible to set the aggregate thresholds to be equal. In this case, the sharable part of the buffer can be used up by any drop-priority buffers.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A method of operating a buffer in a communications device, said buffer including a guaranteed buffer portion for each port of a designated service class and drop priority and a shared buffer portion having an aggregate threshold for each class and drop priority, for each queue in said buffer a first variable S being a queue length in the guaranteed buffer pool and a second variable Sshared being a queue length of said shared buffer portion, said method comprising the steps of:
   enqueuing arriving buffer data and incrementing S correspondingly if S is less than said guaranteed buffer portion;
   enqueuing the buffer data and incrementing Sshared correspondingly if Sshared is less than the shared buffer portion and Sshared is less than a maximum amount of buffers of a given drop priority that may be shared for a service class; and
   otherwise determining whether to discard the buffer data wherein said step of determining includes the steps of:
   discarding the buffer and setting an EPD state if the buffer data is the start of a packet,
   discard the buffer and set the PPD state if the buffer is not the end of the packet;
   if the buffer is the end of the packet and EPD is not set, enqueuing the buffer if total occupied shared buffer is less than the total shared allotment of buffer space for a service class;
   otherwise discarding the buffer.

2. The method of claim 1, wherein prior to enqueuing an early packet discard/partial packet discard state is cleared if arriving buffer data is a start of a packet.

3. The method of claim 1, further including the steps of:
   decrementing S, if the dequeued buffer data is taken from the guaranteed buffer pool,
   decrementing S and Sshared if the buffer dequeued is taken from the shared buffer pool.

4. A method of operating a buffer in a communications device, said buffer including a guaranteed buffer portion for each port of a designated service class and drop priority and a shared buffer portion having an aggregate threshold for each class and drop priority, for each queue in said buffer a first variable S being a queue length in the guaranteed buffer pool and a second variable Sshared being a queue length of said shared buffer portion, said method comprising the steps of:
   enqueuing arriving buffer data and incrementing S correspondingly if S is less than said guaranteed buffer portion;
   enqueuing the buffer data and incrementing Sshared correspondingly if Sshared is less than the shared buffer portion and Sshared is less than a maximum amount of buffers of a given drop priority that may be shared for a service class; and otherwise determining whether to discard the buffer data,
   wherein assuming that drop-priority 1 is the lowest and 4 is the highest, thresholds for a service class i are chosen such that:
   $GRpp_{i1} > GBpp_{i2} > GBpp_{i3} > GBpp_{i4}$ and
   $Ta_{i1} > Ta_{i2} > Ta_{i3} > Ta_{i4}$
   wherein $GBpp_{ij}$ is the guaranteed buffer space for each port and $Ta_{ij}$ is the aggregate threshold for class i and drop priority j.

5. The method of claim 4, wherein minimum buffer space is always available for buffers with class i and drop priority j, relative to buffers with class i and drop priority (j+1).

6. A communications apparatus having a virtual queue utilizing a shared buffer arrangement for ports per service class, said buffer arrangement comprising:
   a guaranteed buffer portion for each port of a designated service class and drop priority; and
   a shared buffer portion having an aggregate threshold for each class and drop priority, far each queue in said buffer a first variable S being a queue length in the guaranteed buffer pool and a second variable Sshared being a queue length of said shared buffer portion, and further being operable to:
   enqueue arriving buffer data and incrementing S correspondingly if S is less than said guaranteed buffer portion;
   enqueuing the buffer data and incrementing Sshared correspondingly if Sshared is less than the shared buffer portion and Sshared is less than a maximum amount of buffers of a given drop priority that may be shared for a service class,
   wherein multi-drop priorities are included per class, said guaranteed buffer portion and said shared buffer portion being divided into multiple sub portions according to said multi-drop priorities,
   wherein lower-drop priority traffic can use the guaranteed or shared space allocated for higher drop-priority traffic but not vice versa,
   wherein said apparatus performs subsequent actions if said buffer data cannot be enqueued according to given criteria including;
   discarding the buffer and setting an EPD state if the buffer data is the start of a packet,
   discard the buffer and set the PPD state if the buffer is not the end of the packet;
   if the buffer is the end of the packet and EPD is not set, enqueueing the buffer if total occupied shared buffer is less than the total shared allotment of buffer space for a service class;
   otherwise discarding the buffer.

7. The apparatus or claim 6, wherein prior to enqueuing, an early packet discard/partial packet discard state is cleared if arriving buffer data is a start of a packet.

8. The apparatus of claim 6, further operable to:
   decrement S, if the dequeued buffer data is taken from the guaranteed buffer pool, and
   decrement S and Sshared if the buffer dequeued is taken from the shared buffer pool.

9. A communications apparatus having a virtual queue utilizing a shared buffer arrangement for ports per service class, said buffer arrangement comprising:
   a guaranteed buffer portion for each port of a designated service class and drop priority; and
   a shared buffer portion having an aggregate threshold for each class and drop priority, for each queue in said buffer a first variable S being a queue length in the guaranteed buffer pool and a second variable Sshared being a queue length of said shared buffer portion, and further being operable to:
   enqueue arriving buffer data and incrementing S correspondingly if S is less than said guaranteed buffer portion;
   enqueuing the buffer data and incrementing Sshared correspondingly if Sshared is less than the shared buffer portion and Sshared is less than a maximum amount of buffers of a given drop priority that may be shared for a service class, wherein multi-drop priorities are included per class, said guaranteed buffer portion and said shared buffer portion being divided into multiple sub portions according to said multi-drop priorities, wherein lower-drop priority traffic can use the guaranteed or shared space allocated for higher drop-priority traffic but not vice versa, wherein assuming that drop-priority 1 is the lowest and 4 is the highest, thresholds for a service class i are chosen such that:

$GRpp_{i1} > GBpp_{i2} > GBpp_{i3} > GBpp_{i4}$ and
$Ta_{i1} > Ta_{i2} > Ta_{i3} > Ta_{i4}$ wherein $GBpp_{ij}$ is the guaranteed buffer space for each port and $Ta_{ij}$ is the aggregate threshold for class i and drop priority j.

* * * * *